Dec. 4, 1962    F. SCHÜRMANN    3,066,622
COMBINED SOWING MACHINE FOR INDIVIDUAL
GRAIN SEED AND THINNING-OUT MACHINE
Filed April 19, 1960    2 Sheets-Sheet 1

United States Patent Office 3,066,622
Patented Dec. 4, 1962

3,066,622
COMBINED SOWING MACHINE FOR INDIVIDUAL
GRAIN SEED AND THINNING-OUT MACHINE
Fritz Schürmann, 9 Fluchtgasse, Vienna, Austria
Filed Apr. 19, 1960, Ser. No. 23,290
1 Claim. (Cl. 111—65)

The invention relates to a device which enables the uniformly deep and individual insertion of seeds into the soil but can also be used for thinning-out plants deriving from the sowed seeds but standing too close side by side.

For introducing seeds into the soil such as for instance turnip seeds to be sowed in equal distances, a uniform depth of seed penetration into the ground is of particular importance. From seeds sown unequally deep those seeds lying too shoal cannot germinate at all in view of the dryness of the ground, whereas a seed lying too deeply has not the strength to bore through to the surface and dies. The plants from the remaining seeds penetrate to the surface at different times thus causing an irregular development of plants.

The above mentioned disadvantages cannot be avoided in the use of the devices hitherto known for sowing and thinning out of plants.

One object of this invention is to eliminate these disadvantages by providing a sowing device which ensures the uniformly deep introduction of seeds in form of individual grains having an equal distance therebetween.

The main object of the present invention is to provide a device which can be used for inserting seeds in rows into the soil as well as for thinning out plants derived from the sowed seeds in a desired predetermined manner, while avoiding the above mentioned disadvantages. This is attained according to the invention by using a device which is adapted to be attached to a tractor and in which a sowing device of the novel structure disclosed hereinafter and illustrated in the appended drawings and a thinning out device of the construction disclosed herein can be mutually exchanged and selectively used.

The details of the invention are illustrated by way of example in the appended drawings and in the pertaining specification, to which the invention is not limited.

In the appended drawings

Figure 1:
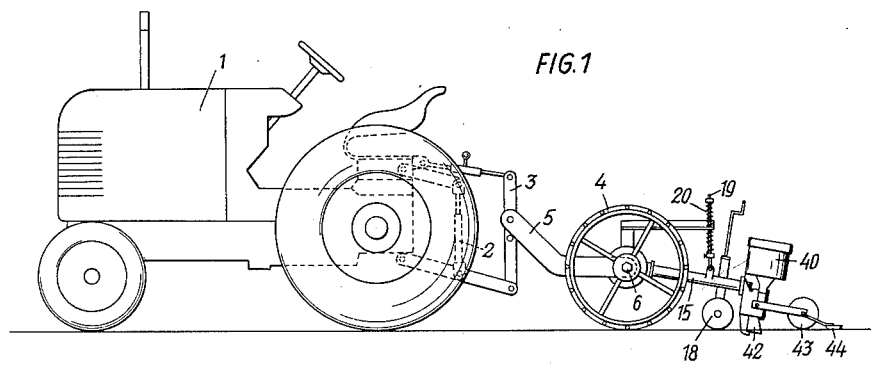
FIG. 1 shows the device as sowing machine fixed on a tractor.

In FIG. 1 with 1 a usual tractor is designated possessing at its rear end a hydraulic elevating mechanism 2 at which a support device 3 for fixing any agricultural devices, for instance the sowing and thinning-out device according to the invention is provided. As the hydraulic elevating mechanism 2 and the support device 3 is not of importance for the invention, a detailed description of these parts may be omitted.

Figures 3, 6:
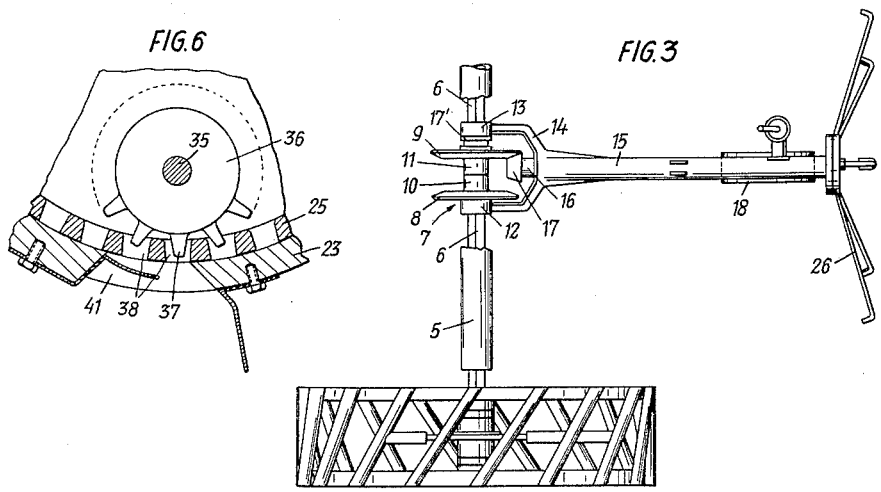
FIG. 3 is a plan view of the thinning-out machine represented in FIG. 2.
FIG. 6 shows a detail of the sowing device along the line VI—VI of FIG. 4.
Figure 4:
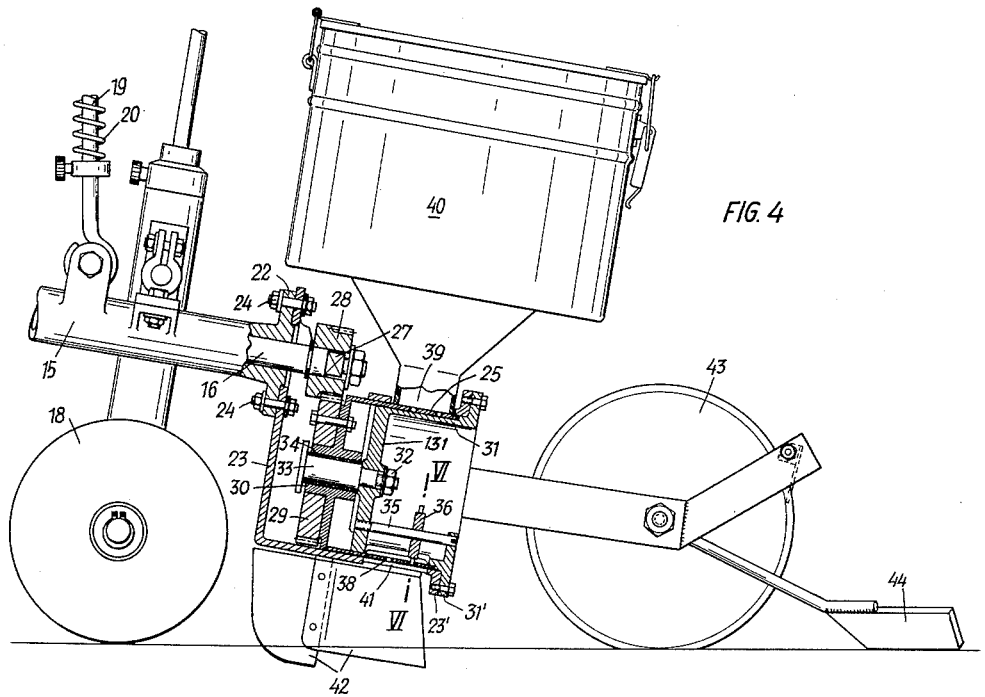
FIG. 4 shows details of the sowing device partially in section and partially in view.
Figure 5:
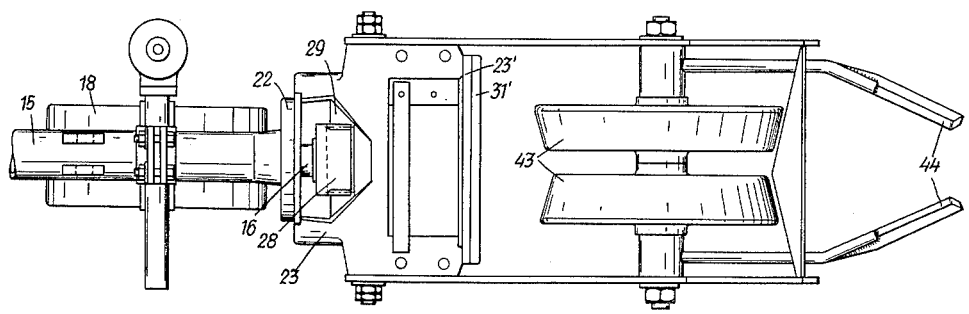
FIG. 5 is a plan view of the sowing device shown in FIG. 4.

The device according to the invention possesses driving wheels 4 which are also called gripper wheels. These wheels can be connected to the support device 3 in suitable manner by means of a machine frame 5. A square shaft or a hexagonal shaft 6 transmits the driving moment from the wheels 4 to at least one bevel gear wheel 7. Several of such bevel gear wheels can be arranged on the shaft 6 in equal distances. The distances of the gears correspond to the distances of the seed rows. Each of these gears 7 preferably consists of two conical wheels 8 and 9 (FIG. 3) locating with their hubs 10 and 11 on the shaft 6. On both sides of the pair of conical wheels the hubs 12, 13 of a fork 14 are arranged freely rotatable, which is provided at the front end of the support tube 15. Inside of this support tube 15 the driving shaft 16 is positioned for a conical pinion 17 which can be in engagement with one of the conical wheels 8, 9. Between the hub 13 and the bevel wheel 9 an opening adjusting ring 17' is set up on the hexagonal shaft 6. The width of the hubs 10, 11 of the conical wheels 8, 9 is measured in such a manner that after insertion of the adjusting ring 17' the conical wheel 9 engages with the pinion 17, on the one side, and the conical wheel 8 is kept out of engagement with the pinion 17, on the other side, whereby it is in close contact with the hub 12. The adjusting ring can also be positioned between the conical wheel 8 and the hub 12. In one case both conical wheels are kept with security out of engagement with the pinion 17, in the other case the conical wheel 8 is positively in engagement with the pinion 17.

The support tube 15 is supported against the soil by means of a support roller 18 being adjustable in height relative to the support tube. Since the support tube 15 is hingedly fixed on the machine frame by means of the fork 14, a support lever 19 is pivoted at the support tube 15, on which a spring 20 is fitted being adjustable with respect to its fixation. This spring forms the elastic intermediate member to a lever 21 being a part of the stationary machine housing 5. It is to be seen that the support tube 15 can be pushed downwardly by means of the spring 20 on the support lever 19 with a predetermined force and that the height of the support tube 15 can be altered relatively to the soil by an operating person at any time by adjusting the support roller 18.

Figure 2:
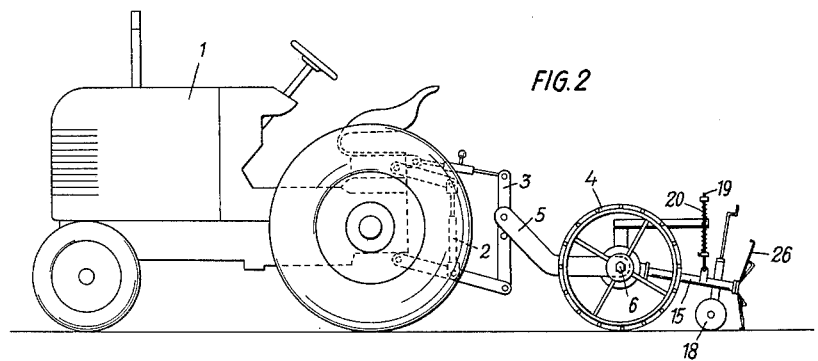
FIG. 2 is a similar representation as FIG. 1, where the device is mounted as thinning-out machine.

As already mentioned, in FIG. 1 the device according to the invention is illustrated as sowing machine which should be now described in a detailed manner. The support tube 15 possesses a flange 22 at which the casing 23 of the sowing device can be fixed by means of screws. The driving shaft 16 situated for the sowing wheel 25 and for the thinning-out implements 26 (FIG. 2) respectively, in the support tube 15, projects with a square 27 or the like out of the support tube 15. In the case of the assembly as sowing machine on the square 27 a drive gear 28 is mounted being in engagement with the toothed wheel 29 mounted on the hub 30 of the sowing wheel 25. By the casing 23 an outer sleeve-like body is formed surrounding the sowing wheel 25 and ending in a flange 23' which is fixedly connected to the flange 31' of a body having also a sleeve-like form but extending inside of the sowing wheel. The casing 23 is open at the upper side towards a seed hopper 40 of any construction, by providing an opening 39, so that the individual seed grains can penetrate to the bored recesses 38 of the sowing wheel arranged in rows. The individual seed grains practically fill in all recesses, so that almost no recess remains empty, whereafter it passes the opening 39. The opening 39 of the casing can partially be covered by insertions or blinds, so that several ranges of the sowing wheel 25 can be covered, if desired. Furthermore the casing has also an opening 41 at the bottom. The inner sleeve-like body 31 includes a forward end wall 131 through which projects a stub shaft which may comprise a bolt 33 on which the sowing wheel 25 together with the driven gear 29 is rotatably situated by means of a bearing sleeve 34. Driven gear 29 is fixed to the sowing wheel or cylinder 25 for rotation therewith and is in mesh with drive gear 28 so as to be driven thereby. Furthermore the inner sleeve-like body 31 serves still other purposes. It covers longitudinally with the greatest part of its periphery the recesses 38 which, as already mentioned are arranged in rows inside of the sowing wheel, on the one side; and it serves as support for an axis 35 on which in the present embodiment one or more ejector wheels 36 are sitting freely rotatable, the pins of which engaging in the bored recesses 38.

The spacing of the pins 37 corresponds to that of the recesses 38 in the sowing wheel with which the pins cooperate. The recesses 38 are arranged in such manner that the seeds are located in the seed row at the desired distance. Thus, for instance the spacing in the first two rows of the sowing wheel may amount to about 20 mm., and the recesses 38 in the second row are staggered relative to the recesses in the first row. This results in two different distances of the seeds in the seed row. The individual rows of recesses can be covered if desired.

By means of the machine a straight row of the seeds can be attained, and thereby the plants in said row will be at the same distance from each other. This is a necessary condition for obtaining accurate thinning-out of the plants by a thinning-out machine. According to the invention, the thinning-out implements can be used in the same machine.

The represented construction makes it possible after loosening the screws 32 to draw out the inner sleeve-like body 31 from the casing 23 together with the driving toothed wheel 29. For dismounting the whole sowing device it is only necessary to loosen the screws 24 and the pinion 28.

At the underside of the casing 23 of the sowing wheel a sowing share 42 is provided which during operation penetrates into the soil and drills a groove for the seeds being ejected individually by the ejector wheel 36. It is to be seen that the depth of penetration of the sowing share in the soil can be exactely observed by the pressure of the spring 20 and the supporting effect of the wheel 18 under scanning of the unevenness of the soil, independent of the character of the soil crumb being often very different. At the casing 23 of the sowing device finally still a further roller 43 can be arranged, the peripheral surface of which roller being concave in cross-section or two rollers 43 having conical peripheral surfaces can be arranged. This roller being subordinated to the sowing share presses on the soil beside the seed row thus favouring the growing of the germinating paints. Subsequently on the roller 43 furthermore a sheet 44 is provided which, for preventing drying up of the places pressed on, staples loose earth on the latter.

As it is to be seen all above described elements which are arranged according to the invention on the machine cooperates to enable the individual seed grain lying in the soil not only in the same distance from the neighbouring seed of the same row but also in the same distance from the surface of the soil. The pressing roller 43 and the sheet 44 favour then uniform germinating of the seeds.

After detaching the sowing device and drawing off the pinion 28 from the square 27 of the driving shaft 16 the machine is used as thinning-out machine for the plants from the sowed seeds standing too close side by side.

For this purpose thinning-out implements 26 known per se are mounted on the square 27. Also in the thinning-out operation the combined arrangement according to the invention of the pressure spring 20 and the infinitely adjusted support roller 18 enables the exact observation of the depth of penetration of the rotating working implements in the soil.

What I claim is:

A seed planter for planting seeds in rows, comprising a device adapted to be towed by a tractor and including a drive shaft extending in the direction of travel of said tractor rearwardly thereof, means for rotating said drive shaft, a housing for said drive shaft, said housing having a rear end formed as a flange, a drive gear on said drive shaft rearwardly of said flange, a casing readily detachably connected to said flange and extending rearwardly thereof, said casing terminating in a radially outwardly directed annular flange, a substantially cylindrical sleeve readily detachably connected to said annular flange and extending forwardly thereof inside said casing in radially inwardly spaced concentric relation thereto, said sleeve having a forward end wall, a stub shaft in said end wall and projecting forwardly thereof beneath said drive gear, a driven gear on said stub shaft in said casing, said driven gear being in meshing relation with said drive gear, a cylindrical sowing cylinder fixed to said driven gear and extending rearwardly thereof between said casing and sleeve in slightly spaced concentric relation thereto, said sowing cylinder being formed with a plurality of circumferential rows of seed pockets therethrough, a seed hopper carried by said casing above the same, said hopper and casing having registering openings for supplying a constant supply of seeds to said pockets, said sleeve and casing being formed with registering bottom openings, an ejector wheel for each row of pockets, means mounting said ejector wheels in said sleeve for rotation in a direction at right angles to the direction of travel of said tractor, said wheels having teeth projecting into said pockets through said bottom opening of said sleeve to discharge seeds from said pockets through said bottom opening of said casing, and furrow forming means carried by said casing beneath the same and forwardly of said bottom opening for forming a furrow to receive said seeds, and furrow closing means on said planter rearwardly of said furrow forming means.

References Cited in the file of this patent

UNITED STATES PATENTS

| | | |
|---|---|---|
| 150,771 | McCaleb | May 12, 1874 |
| 1,474,599 | Martin | Nov. 20, 1923 |
| 1,878,960 | McKay | Sept. 20, 1932 |
| 2,510,658 | Rassman | June 6, 1950 |
| 2,579,988 | Walburn | Dec. 25, 1951 |

FOREIGN PATENTS

| | | |
|---|---|---|
| 181,109 | Austria | Feb. 25, 1955 |
| 196,649 | Austria | Mar. 25, 1958 |
| 501,337 | Belgium | Mar. 15, 1951 |
| 1,078,779 | France | May 12, 1954 |
| 1,140,658 | France | Mar. 4, 1957 |